Patented Dec. 18, 1945

2,391,180

UNITED STATES PATENT OFFICE 2,391,180

SULPHONAMIDO AZO PYRAZOLONES

James G. McNally, Oak Ridge, Tenn., and Joseph B. Dickey, Rochester, N. Y., assignors to Eastman Kodak Company, Rochester, N. Y., a corporation of New Jersey No Drawing. Application March 18, 1944, Serial No. 527,145

6 Claims. (Cl. 260—163)

This invention relates to azo compounds containing a pyrazolone nucleus and to a process for preparing them.

A number of acid dyes which are monoazo compounds containing a pyrazolone nucleus have been known for many years and have been used to dye wool or to prepare color lakes. It has also been proposed to dye cellulose ester rayon with nonsulphonated monoazo compounds containing a pyrazolone nucleus of the following formula:

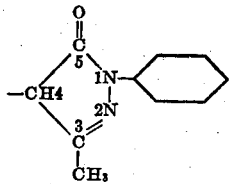

Such monoazo compounds, however, dye cellulose ester rayon only at low rates of speed at the ordinary dyeing temperatures. Subsequently, it was proposed to dye cellulose ester rayon with monoazo dyes containing a pyrazolone nucleus of the following formula:

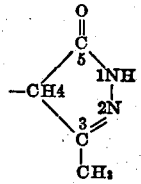

However, such pyrazolone dyes have low tinctorial power, but are useful for tinting cellulose ester rayon.

We have now found a kind of non-acid monoazo compound which has not only very good fastness to light, but also can be employed to dye cellulose ester rayon and fabrics made therefrom, since the compounds color cellulose ester rayon at a practical rate of speed at low temperatures (60° to 65° C.) and have a high tinctorial power for the rayon.

It is, accordingly, an object of our invention to provide new monoazo compounds and to provide a process for the preparation thereof. Another object is to provide cellulose ester rayon colored with such compounds. Other objects will become apparent hereinafter.

The compounds of our invention can be represented by the following general formula:

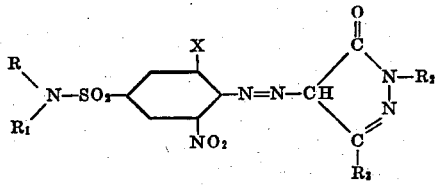

wherein R represents an aliphatic alcohol radical, $R_1$, $R_2$ and $R_3$ each represents a member selected from the group consisting of hydrogen and an aliphatic alcohol radical and X represents a member selected from the group consisting of hydrogen and halogen.

To prepare one of our new azo compounds, we diazotize an appropriate monocyclicamine of the benzene series and couple the resulting diazonium salt with the appropriate pyrazolone derivative. The appropriate monocyclic amines of the benzene series can be represented by the following formula:

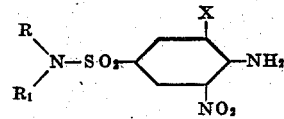

wherein R, $R_1$ and X have the values set forth above. The appropriate pyrazolone derivatives can be formulated as follows:

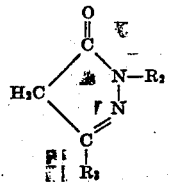

wherein $R_2$ and $R_3$ have the values set forth above.

The following examples will serve to illustrate our new monoazo compounds and the manner of obtaining the same.

*Example 1.—4-(4-N-ethylsulphamyl-2-nitrophenylazo)-3-methyl-5-pyrazolone*

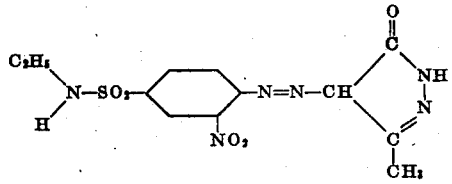

50 cc. of concentrated sulphuric acid were cooled to 8° C., and 7.6 g. of dry powdered sodium nitrite were stirred in portionwise. Then the whole was heated gently to 70° C. The mixture was then cooled to 10° C., and 100 cc. of a mixture of propionic and acetic acids (in the ratio of one part by weight of propionic acid and six parts of acetic acid) were added while keeping the temperature below 20° C. After cooling to 5° C. and while maintaining a temperature of 5-10° C., there were added portionwise 30 g. of 4-(N-ethylsulphamyl)-2-nitroaniline and 100 cc. of the above 1:6 acid mixture. Then the whole was stirred for two hours at 5° C. Excess nitrous acid was removed by the addition of urea, and then the solution was filtered. The resulting diazonium solution was added to a well-stirred and cooled solution of 9.8 g. of 3-methyl-5-pyrazolone in 75 cc. of acetic acid. Sufficient sodium carbonate was added to neutralize the sulphuric acid. The dye precipitated immediately and, after standing one hour, was filtered, washed well with water, and dried. A yield of approximately 90 per cent was obtained. The dye melted at 244°–246° C.

*Example 2.—4-(6-chloro-4-N-ethylsulphamyl-2-nitrophenylazo)-5-pyrazolone*

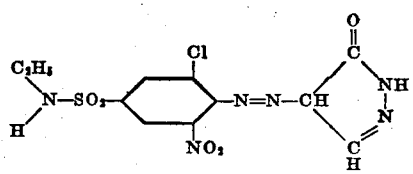

Nitrosyl sulphuric acid was prepared in the following manner: 50 cc. concentrated sulfuric acid was placed in a flask equipped with a mechanical stirrer and thermometer and cooled in an ice bath to 3° C. 6.9 g. of finely powdered anhydrous sodium nitrite were poured rapidly during one minute into the vortex of the stirrer to insure that the crystals go immediately below the surface. The temperature was kept below 70° C., and stirring was maintained until a clear solution was obtained. This solution was cooled to 12°–14° C. and 104 cc. of acetic acid were then run in, allowing the temperature to rise to 17° C. Concurrently with the preparation of the nitrosyl sulphuric acid, 25.5 g. of 6-chloro-4-(N-ethylsulphamyl)-2-nitroaniline were stirred into 94 cc. of acetic acid. To this vigorously stirred mixture was added the nitrosyl sulphuric acid as prepared above, while maintaining a temperature of 17°–18° C. Stirring was continued for 2 hours until all has dissolved and a test portion was completely soluble in water. The resulting diazonium solution was added to a well-cooled solution of 8.4 g. of 5-pyrazolone in 75 cc. of acetic acid. Sufficient sodium carbonate was added to neutralize the sulphuric acid. The dye precipitated at once and, after standing one hour, was filtered, washed well with water and dried. A yield of approximately 90 per cent was obtained.

The pyrazolone compounds which we employ in practicing our invention are prepared in known manner. For example, 5-pyrazolone is best prepared from formylacetic ester and hydrazine. The 5-pyrazolones containing an alcohol radical in the 3-position are similarly prepared, e. g., 3-methyl-5-pyrazolone by the action of hydrazine upon acetoacetic ester, and 3-ethyl-5-pyrazolone, by the action of hydrazine upon propionacetic ester. The 5-pyrazolones containing an alcohol radical in the 1-position are similarly prepared by employing a hydrazine in which one of the hydrogen atoms is replaced by an alcohol radical. Thus 1-methyl-5-pyrazolone is prepared by the action of methyl hydrazine upon formylacetic ester and 1,3-dimethyl-5-pyrazolone by the action of methyl hydrazine upon acetoacetic ester, in accordance with the known methods. Instead of methyl hydrazine, β-hydroxyethyl hydrazine can be employed.

The monocyclic amines, which we employ as diazo components in practicing our invention, can be prepared as follows:

*Example 3.—4-(N-ethylsulphamyl)-2-nitroaniline*

245 g. of 4-chloro-3-nitrobenzene sulphonic acid sodium salt were heated with 460 g. of chlorosulphonic acid at 135° to 140° C. for 6 hours. The mixture was cooled and poured into ice water. 4-chloro-3-nitrobenzene sulphonyl chloride separated out as a white crystalline compound which melted at 101° to 102° C. after filtering, washing with water and drying. 640 g. of this sulphonyl chloride were then dissolved in 1700 cc. of acetone. The resulting solution was cooled to 3° C. Then 680 g. of an aqueous solution of ethylamine (containing 33 per cent by weight of ethylamine) were added over a period of 2.5 hours. The resulting mixture was stirred for several hours at 10° to 15° C. It was then added to 8 liters of water and ice. 4-(N-ethyl sulphamyl)-2-nitrochlorobenzene separated out. It was filtered off, washed with water and dried. It melted at 89° to 91° C. 1 gram-mole of this chlorobenzene derivative was placed in a shaking autoclave with 700 cc. of concentrated aqueous ammonia. The autoclave was closed and then heated with shaking at 160° C. for 4 hours. When cool, the autoclave was opened and the yellow crystals of 4-(N-ethylsulphamyl)-2-nitroaniline were filtered off, washed with water and dried.

In a similar manner, other sulphamyl derivatives containing other alcohol radicals on the nitrogen atom on the sulphamyl group can be prepared, using instead of ethylamine other amines, such as methylamine, β-ethoxyethylamine, β-methoxyethylamine, isopropylamine, n-butylamine, dimethylamine, β-sulphoethylamine or β-(β-hydroxyethoxy)-ethylamine. If ammonia is employed instead of ethylamine in the above example, the unsubstituted sulphamyl derivative is obtained.

The halogen-containing diazo components are best obtained by direct halogenation of the sulphamyl derivatives prepared as illustrated above. The following example will serve to illustrate this halogenation.

Example 4.—6-chloro-4-(N-ethylsulphamyl)-2-nitroaniline 0.1 gram-mole of 4-(N-ethylsulphamyl)-2-nitroaniline was placed in 250 cc. of acetic acid. The resulting mixture was added to acetic acid containing 0.11 gram-mole of chlorine, at 0° C. The reaction mixture was allowed to warm slowly to 25° C. After the mixture was allowed to stand at 25° C. for 10 hours, the reaction mixture was diluted with water to precipitate the chloro derivative. The chloro derivative was purified by recrystallization from acetic acid.

The new azo compounds of our invention are of greatest utility for the coloration of textile materials comprising organic derivatives of cellulose. However, they may be used for the coloration of non-vegetable textile fibers, in general. Thus, they can be used to color organic derivatives of cellulose, silk, wool, nylon, "Vinyon," and protein synthetic wools, also cellulose ester and cellulose ester lacquers, as well as lacquers from vinyl compounds can be colored. The coloration produced by our new azo compounds is generally greenish yellow.

Typical organic derivatives of cellulose that can be colored with our new azo compounds include the hydrolyzed, as well as the unhydrolyzed, cellulose carboxylic esters, such as cellulose acetate, cellulose propionate and cellulose butyrate, and the hydrolyzed, as well as the unhydrolyzed, mixed cellulose carboxylic esters, such as cellulose acetate propionate and cellulose acetate butyrate, and the cellulose ethers, such as methyl cellulose, ethyl cellulose and benzyl cellulose.

The azo compounds of our invention are for the most part relatively insoluble in water and, accordingly, they may be advantageously directly applied to the textile material undergoing coloration in the form of an aqueous suspension which can be prepared by grinding the dye to a paste, in the presence of a sulphonated oil soap, or other suitable dispersing agent and dispersing the resulting paste in water. In some instances the compounds may possess sufficient solubility in water to render the use of a dispersing agent unnecessary. Generally speaking, however, the use of a dispersing agent is desirable.

Direct dyeing operations can, with advantage, be conducted at temperatures of about 75° to 85° C., but any suitable temperature may be used. Thus the textile material to be dyed or colored is ordinarily added to the dyebath at a temperature lower than that at which the main portion of the dyeing is to be effected, e. g., a temperature of from 45° to 55° C. Following this the temperature is raised to that selected for carrying out the operation. The temperature at which the process is continued may vary somewhat, depending upon the particular material undergoing coloration. As understood by those skilled in the art, the intensity of dyeing can be varied by varying the proportion of dye to the material undergoing preparation. Generally speaking, 1 to 3 per cent by weight of the dye to material is employed, although any desired proportions can be used.

Suitable dispersing agents are disclosed in U. S. Patent 2,115,030, issuing April 26, 1938. The process disclosed in the aforesaid patent for the dyeing of cellulose acetate can be used in applying the dyes in the present invention to cellulose acetate. While a satisfactory method for dyeing has been disclosed herein, it will be understood that any other suitable methods for dyeing the non-vegetable textile materials named herein can be employed. Lacquers may be colored with the dye compounds of our invention by the methods customarily employed in the lacquer art.

The term nylon is intended to describe a linear polyamide resin such as set forth in United States Patent 2,071,250, dated February 16, 1937. The term aliphatic alcohol radical is intended to mean any radical derivable from an aliphatic alcohol by dropping the OH group, e. g., ethyl from ethyl alcohol, allyl from allyl alcohol, tertiary butyl from tertiary butyl alcohol, etc.

What we claim as our invention and desire to be secured by Letters Patent in the United States is:

1. The azo compounds of the following general formula:

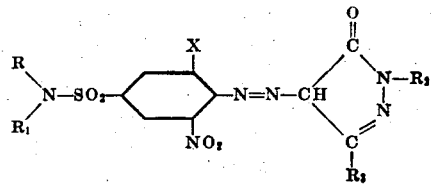

wherein R represents a member selected from the group consisting of a lower alkyl group, a lower hydroxyalkyl group, a lower alkoxyalkyl group, a lower hydroxyalkoxyalkyl group, a lower sulphoalkyl group and a short chain unsaturated hydrocarbon group whose unsaturation consists of a double bond, $R_1$ represents a member selected from the group consisting of hydrogen and a lower alkyl group, $R_2$ represents a member selected from the group consisting of hydrogen a lower alkyl group and a lower hydroxyalkyl group, $R_3$ represents a member selected from the group consisting of hydrogen and a lower alkyl group and X represents a member selected from the group consisting of hydrogen and halogen.

2. The azo compounds of the following general formula:

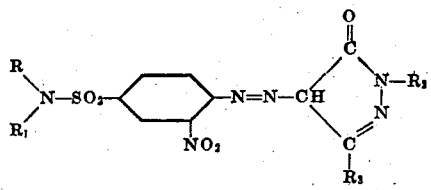

wherein R represents a member selected from the group consisting of a lower alkyl group, a lower hydroxyalkyl group, a lower alkoxyalkyl group, a lower hydroxyalkoxyalkyl group, a lower sulphoalkyl group and a short chain unsaturated hydroocarbon group whose unsaturation consists of a double bond, $R_1$ represents a member selected from the group consisting of hydrogen and a lower alkyl group, $R_2$ represents a member selected from the group consisting of hydrogen, a lower alkyl group and a lower hydroxyalkyl group and $R_3$ represents a member selected from the group consisting of hydrogen and a lower alkyl group.

3. The azo compounds of the following general formula:

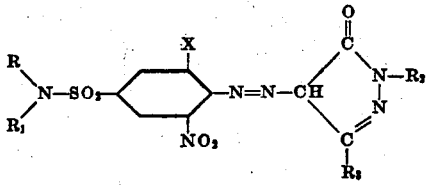

wherein R represents a member selected from the group consisting of a lower alkyl group, a lower hydroxyalkyl group, a lower alkoxyalkyl group, a lower hydroxyalkoxyalkyl group, a lower sulphoalkyl group and a short chain unsaturated hydrocarbon group whose unsaturation consists of a double bond, $R_1$ represents a member selected from the group consisting of hydrogen and a lower alkyl group, $R_2$ represents a member selected from the group consisting of hydrogen, a lower alkyl group and a lower hydroxyalkyl group and $R_3$ represents a member selected from the group consisting of hydrogen and a lower alkyl group and X represents halogen.

4. The azo compounds of the following general formula:

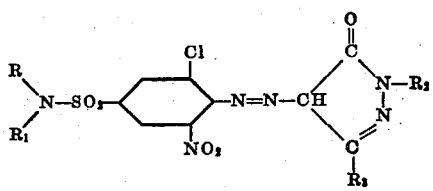

wherein R represents a member selected from the group consisting of a lower alkyl group, a lower hydroxyalkyl group, a lower alkoxyalkyl group, a lower hydroxyalkoxyalkyl group, a lower sulphoalkyl group and a short chain unsaturated hydrocarbon group whose unsaturation consists of a double bond, $R_1$ represents a member selected from the group consisting of hydrogen and a lower alkyl group, $R_2$ represents a member selected from the group consisting of hydrogen, a lower alkyl group and a lower hydroxyalkyl group and $R_3$ represents a member selected from the group consisting of hydrogen and a lower alkyl group.

5. 4-(4-N-ethylsulphamyl-2-nitrophenylazo)-3-methyl-5-pyrazolone.

6. 4-(6-chloro-4-N-ethylsulphamyl-2-nitrophenylazo)-5-pyrazolone.

JAMES G. McNALLY.
JOSEPH B. DICKEY.